(12) United States Patent
Bakr et al.

(10) Patent No.: US 10,493,533 B2
(45) Date of Patent: Dec. 3, 2019

(54) SCALABLE SHAPE- AND SIZE-CONTROLLED SYNTHESIS OF METAL NANO-ALLOYS

(71) Applicant: KING ABDULLAH UNIVERSITY OF SCIENCE AND TECHNOLOGY, Thuwal (SA)

(72) Inventors: Osman M. Bakr, Thuwal (SA); Kristian Rahbek Knudsen, Thuwal (SA); Alec Lagrow, Thuwal (SA); Noktan M. Alyami, Thuwal (SA); Hakim Mehenni, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 305 days.

(21) Appl. No.: 15/326,559

(22) PCT Filed: Jul. 15, 2015

(86) PCT No.: PCT/IB2015/001397
§ 371 (c)(1),
(2) Date: Jan. 16, 2017

(87) PCT Pub. No.: WO2016/009274
PCT Pub. Date: Jan. 21, 2016

(65) Prior Publication Data
US 2018/0221961 A1 Aug. 9, 2018

Related U.S. Application Data

(60) Provisional application No. 62/025,599, filed on Jul. 17, 2014.

(51) Int. Cl.
*B22F 9/26* (2006.01)
*B22F 1/00* (2006.01)
(Continued)

(52) U.S. Cl.
CPC ............. *B22F 9/26* (2013.01); *B01J 19/1843* (2013.01); *B22F 1/0018* (2013.01);
(Continued)

(58) Field of Classification Search
CPC ........ B22F 9/26; B22F 1/0018; C22C 1/0466; B01J 19/1843; F27D 1/00
See application file for complete search history.

(56) References Cited

U.S. PATENT DOCUMENTS 6,679,937 B1 * 1/2004 Kodas .................. B01J 2/003
106/287.19
6,846,565 B2 * 1/2005 Korgel .................. B82Y 10/00
428/402

(Continued)

FOREIGN PATENT DOCUMENTS

WO WO2013186740 A1 12/2013

OTHER PUBLICATIONS

International Search Report and Written Opinion of Application No. PCT/IB2015/001397 dated Nov. 19, 2015, 16 pages.
(Continued)

*Primary Examiner* — Cam N. Nguyen
(74) *Attorney, Agent, or Firm* — Billion & Armitage; Lisbeth C. Robinson

(57) ABSTRACT

Embodiments of the present disclosure provide for a continuous-flow reactor, methods of making metal nano-alloys, and metal nano-alloys.

10 Claims, 4 Drawing Sheets

(51) Int. Cl.
*C22C 1/04* (2006.01)
*B01J 19/18* (2006.01)
*F27D 1/00* (2006.01)
*B22F 9/24* (2006.01)
*C22C 5/04* (2006.01)
*C22C 19/03* (2006.01)

(52) U.S. Cl.
CPC .............. *C22C 1/0466* (2013.01); *F27D 1/00* (2013.01); *B01J 2219/00033* (2013.01); *B22F 9/24* (2013.01); *C22C 5/04* (2013.01); *C22C 19/03* (2013.01)

(56) References Cited

U.S. PATENT DOCUMENTS

| | | | |
|---|---|---|---|
| 7,459,138 B2* | 12/2008 | Resasco | B01J 8/0055 423/447.3 |
| 7,507,687 B2* | 3/2009 | Kodas | B22F 1/025 427/115 |
| 7,824,466 B2* | 11/2010 | Vanheusden | B22F 1/0022 75/362 |
| 8,597,397 B2* | 12/2013 | Kunze | B22F 1/0022 75/362 |
| 2007/0160899 A1* | 7/2007 | Atanassova | H01M 4/8807 429/413 |
| 2009/0221418 A1* | 9/2009 | Fischer | B01J 23/44 502/155 |
| 2011/0014550 A1* | 1/2011 | Jiang | H01M 4/8842 429/528 |
| 2011/0048171 A1 | 3/2011 | Enright | |
| 2012/0295110 A1 | 11/2012 | Arquilliere | |
| 2013/0172177 A1* | 7/2013 | Domke | B01D 53/945 502/242 |

OTHER PUBLICATIONS

Philippa B. Cranwell et al: "Flow 1-9 synthesis using gaseous ammonia in a Teflon AF-2400 tube-in-tube reactor: Paal-Knorr pyrrole formation and gas concentration measurement by inline flow titration", Organic & Biomolecular Chemistry, vol. 10, No. 30, Mar. 21, 2012 (Mar. 21, 2012), p. 5774, XP055227411.

Sean Newton et al: "Asymmetric Homogeneous Hydrogenation in Flow using a Tube-in-Tube Reactor", Advanced Synthesis & Catalysis, vol. 354. No. 9. Jun. 18, 2012 (Jun. 18, 2012), pp. 1805-1812, XP055227405.

Anastasios Polyzos et al: "The Continuous-Flow Synthesis of Carboxylic Acids using C02 in a Tube-In-Tube Gas Permeable Membrane Reactor", Angewandte Chemie International Edition, vol. 50. No. 5, Feb. 1, 2011 (Feb. 1, 2011), pp. 1190-1193, XP055227408.

* cited by examiner

SCALABLE SHAPE- AND SIZE-CONTROLLED SYNTHESIS OF METAL NANO-ALLOYS

CROSS-REFERENCE TO RELATED APPLICATIONS

This application is the National Stage of International Application No. PCT/162015/001397, filed 15 Jul. 2015, which claims the benefit of and priority to U.S. Provisional Application Ser. No. 62/025,599, having the title "SCALABLE SHAPE-AND SIZE-CONTROLLED SYNTHESIS OF METAL NANO-ALLOYS," filed on 17 Jul. 2014, the entire disclosures of which are incorporated by reference in their entireties as if fully set forth herein.

BACKGROUND

Efficient size and shape controlled synthesis of nanoparticles remains challenging for the nano-scale research field, especially in the synthesis of metal alloy nanoparticles. Alloy nanoparticles are highly interesting for their properties in catalysis, magnetic properties, opto electronic properties and their potential use in biomedical applications. Challenges in their synthesis have lately focused on shape and size control in order to obtain morphological uniformity. Several groups have reported on shape controlled batch synthesis using metal carbonyl complexes as CO donors as well as the use of gasses under pressure yielding octahedral and pseudo-octahedral shapes with long carbon chain amines as surfactants. These batch methods are not amenable to scaling up to an industrial scale synthesis.

Scaling the synthesis beyond a few milligrams while maintaining control of morphology has received less attention. For nanoparticles to become technologically and commercially viable, the need for a robust scalable synthesis is ubiquitous. Traditional batch slow heating or "hot injection" methods require solvents, surfactants and ligand with a high boiling point in order to reach the temperatures required for nucleation. Furthermore, they are difficult to scale, pose safety concerns and are often highly sensitive to impurities.

These demands are particularly true for platinum nanoparticles. Platinum nanoparticles are interesting due to their activity in the oxygen reduction reaction, especially when used in fuel cells. Due to the high cost of platinum alternatives such as alloys, nanoparticles with reduced platinum content are attractive provided they maintain a high catalytic activity. Also, pure platinum particles suffer from substrate poisoning in certain fuel cell applications. It is well known that nanoparticle size can greatly affect catalytic performance in terms of activity, chemoselectivity and stability. Typically the highest activity is linked to the smallest size by a surface to volume ratio argument. It has been shown though that larger sizes may in some cases be more active. All in all a synthesis that allows for selection of size by tuning reaction parameters and is scalable to industrial scale is therefore highly desirable.

SUMMARY

Embodiments of the present disclosure provide for a continuous-flow reactor, methods of making metal nano-alloys, and metal nano-alloys.

An embodiment of the continuous-flow reactor, among others, includes: a first tubular component having a tubular inlet and a tubular outlet, and a heated tube-in-tube gas reactor fluidly connected to the first tubular component, wherein the heated tube-in-tube gas reactor comprises an inner tube having a gas permeable surface and an outer tube.

An embodiment of the method of producing metal nano-alloys, among others, includes: contacting a reducible metal precursor and a reducing fluid in a continuous-flow reactor to form a mixed solution; and flowing the mixed solution through the continuous-flow reactor for a residence time to form the metal nano-alloys.

An embodiment of the composition, among others, includes: a plurality of metal nano-alloys having a monodisperse size distribution and a uniform shape distribution.

BRIEF DESCRIPTION OF THE DRAWINGS

FIGS. 2A and 2B are HRTEM images of 3 nm particles.

DETAILED DESCRIPTION

Figure 1:
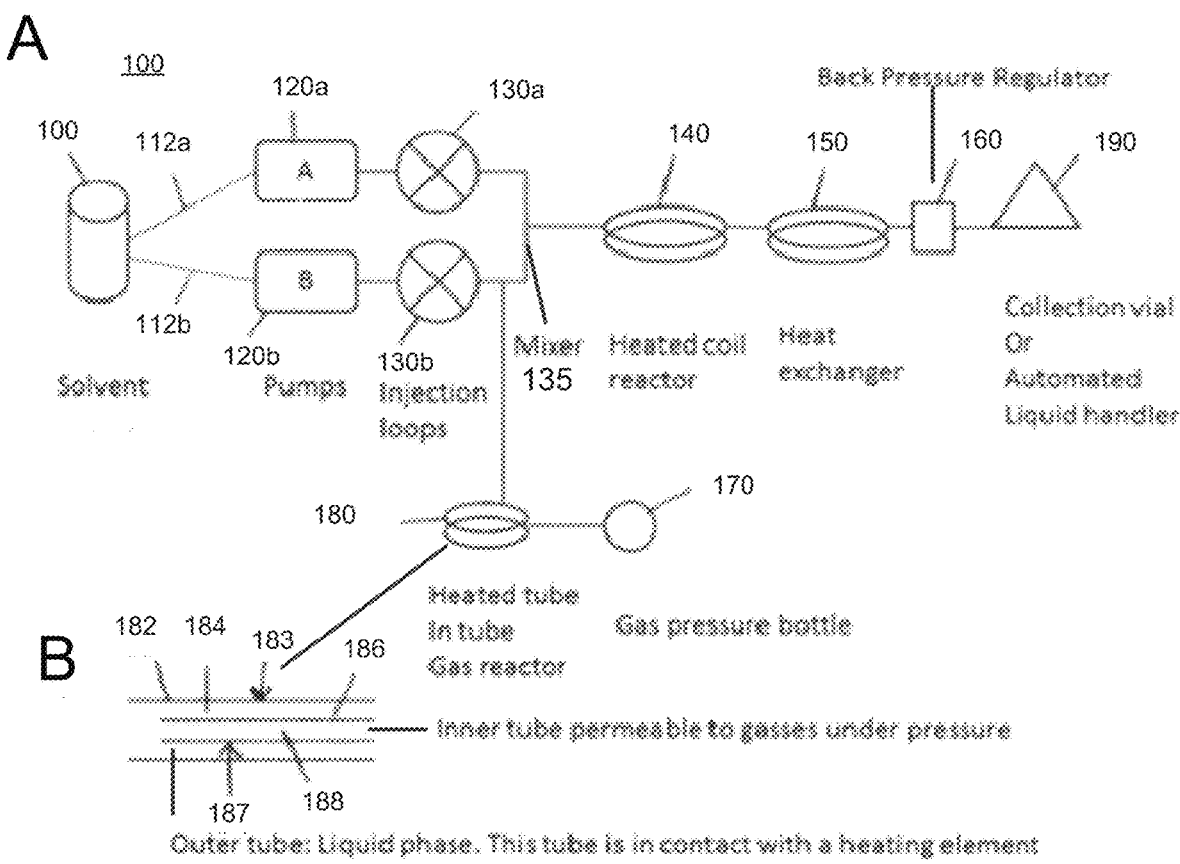
FIG. 1A is a schematic of one embodiment of a continuous flow reactor for manufacturing metal nano-alloys using a reducing gas in a heated tube-in-tube gas reactor and/or a reducing solution.
FIG. 1B is a sectional view of the heated tube-in-tube gas reactor of FIG. 1A depicting the inner and outer tubes.
Figure 2:
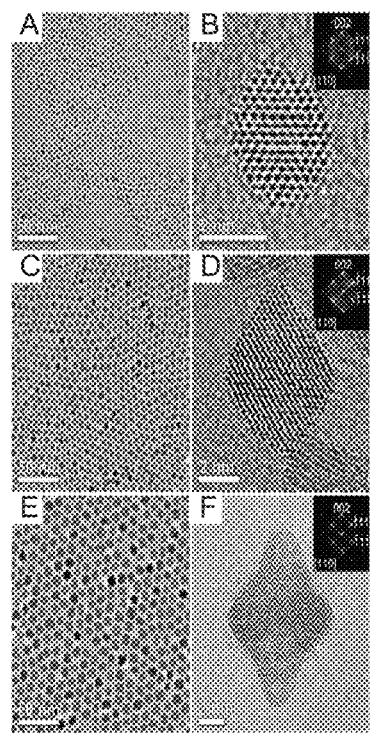
FIGS. 2A-2B are high-resolution transmission electron microscope (HRTEM) images of the nickel-platinum nano-alloys from Example 1 depicting the monodisperse size distribution and uniform shapes.
FIGS. 2C and 2D are HRTEM images of 4.5 nm particles.
FIGS. 2E and 2F are HRTEM images of 9 nm particles.
Figure 3:
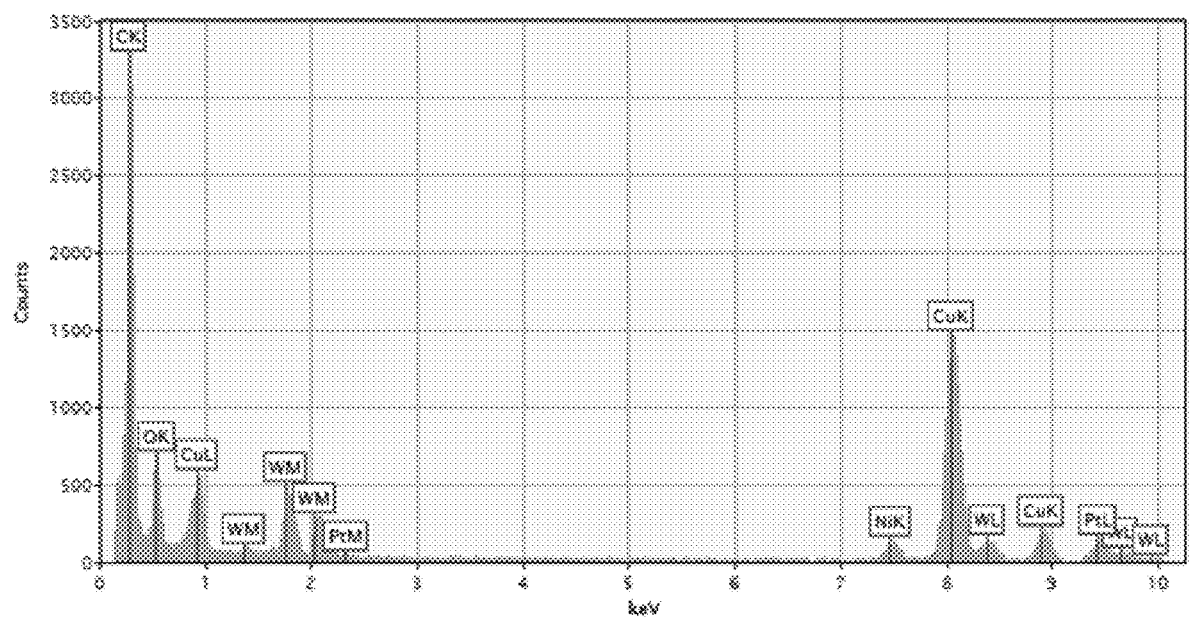
FIG. 3 is an energy dispersive X-ray spectroscopy (EDS) spectrum of the 3 nm particles from Example 1.
Figure 4:
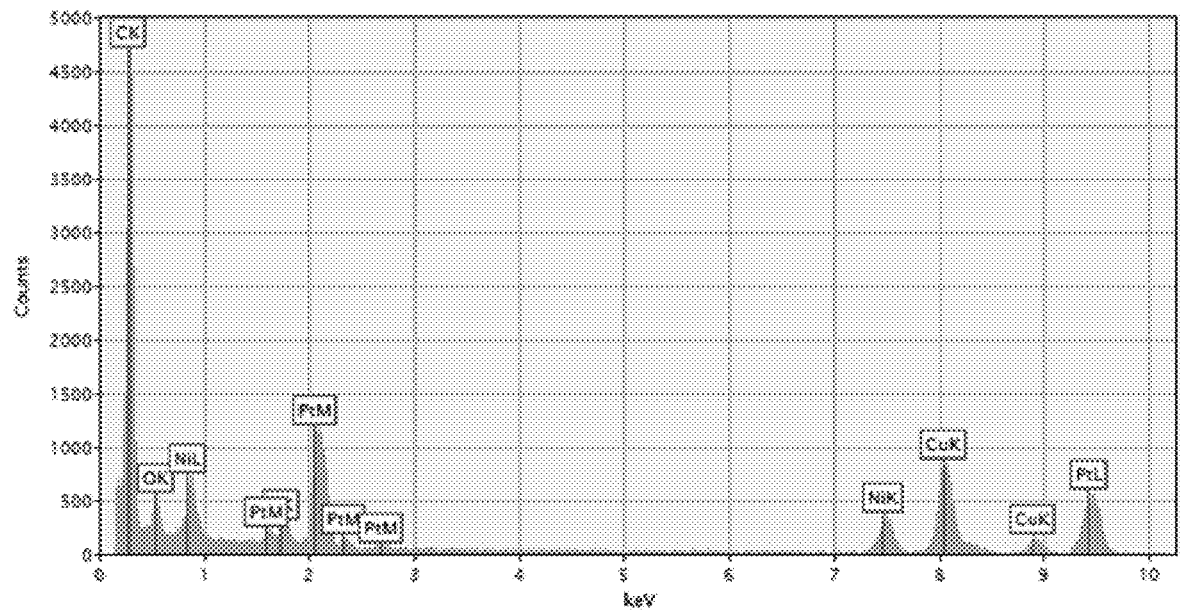
FIG. 4 is an energy dispersive X-ray spectroscopy (EDS) spectrum of the 4.5 nm particles from Example 1.
Figure 5:
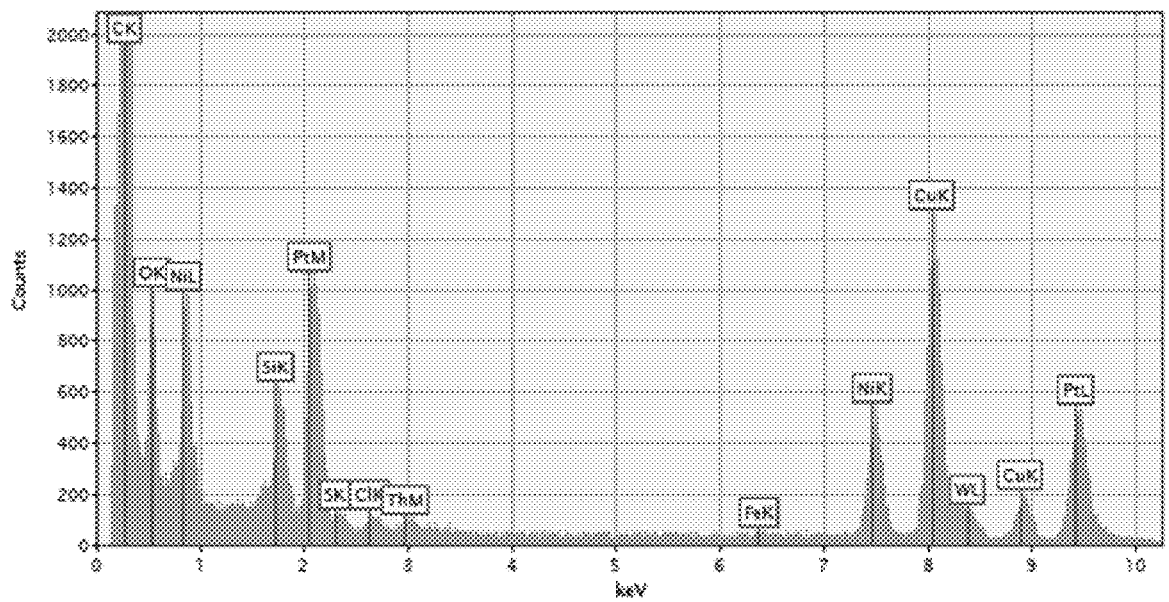
FIG. 5 is an energy dispersive X-ray spectroscopy (EDS) spectrum of the 9 nm particles from Example 1.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Definitions:

The term "alloy", as used herein, refers broadly to a solid composition containing one (pure metal) or a mixture of two or more types of metal atoms, and optionally one or more additional atoms such as oxygen. The alloy can contain two, three, four, or more different metals in various atom (number) ratios. The alloys can be ordered or disordered alloys. The alloy may be a substitutional alloy (in which atoms of one metal are substituted for atoms of a second host metal), an interstitial alloy (in which interstices formed by the closest packed metal structure of a host metal are occupied by a second metal), or a combination of the two. The alloy can contain one, two, three, or more metals selected from platinum (Pt), palladium (Pd), rhodium (Rh), ruthenium (Ru), gold (Au), silver (Ag), nickel (Ni), cobalt (Co), copper (Cu), tungsten (W), iridium (Ir), titanium (Ti), vanadium (V), zirconium (Zr), niobium (Nb), molybdenum (Mo), manganese (Mn), indium (In), tin (Sn), antimony (Sb), lead (Pb), bismuth (Bi), phosphorous (P), and iron (Fe).

The term "nano-alloy" refers to alloy particles having nanometer particle size, i.e. having a greatest dimension less than about 1 micron, less than about 800 nm, less than about 600 nm, less than about 400 nm, less than about 200 nm, less than about 120 nm, less than about 100 nm, less than about 50 nm, less than about 30 nm, or less than about 10 nm.

The term "particle size" and "particle diameter", as used interchangeably herein, mean the average diameter of the image of the particle as viewed by electron microscopy, unless otherwise stated. The size distribution of a collection of particles can be characterized by several values. The term "average particle size" and "average particle diameter" mean the number average of the particle sizes of a collection of particles.

The "span" for a distribution of particles can be computed from the formula $$\text{Span} = \frac{D_{v0.9} - D_{v0.1}}{D_{v0.5}};$$

where $D_{v0.1}$, $D_{v0.5}$, and $D_{v0.9}$ are defined such that 10%, 50%, and 90% of the particles in the collection of particles have a dimension smaller than $D_{v0.1}$, $D_{v0.5}$, and $D_{v0.9}$ respectively.

The coefficient of variation (COV) for a collection of particles is the standard deviation of particle sizes divided (normalized) by the average particle size.

The term "monodisperse", as used herein, characterizes a collection of particles where the particle size scatter is within a narrow range of sizes. A monodisperse collection of particles can be a collection of particles having a span of about 2 or less, about 1 or less, about 0.8 or less, or about 0.5 or less. A monodisperse collection of particles can be a collection of particles having a COV of about 0.5 or less, about 0.4 or less, or about 0.3 or less. A monodisperse collection of particles can be a collection of particles wherein about 40% or more, about 50% or more, about 60% or more, about 70% or more, or about 80% or more of the particles have a particle size that is within ±10 nm, ±8 nm, ±6 nm, ±5 nm, or ±3 nm of the average particle size for the collection of particles. Typically this procedure has a deviation below 1 nm.

The term "uniform shape distribution", as used herein, refers to a collection of particles having similar shapes, e.g., as based upon one or more shape-based measures being within a narrow range for each particles in the collection of particles. The shape-based measures may include an aspect ratio, a roughness, a roundness, and/or a sphericity of the particles. For example, a collection of particles is said to have a uniform shape distribution when about 40% or more, about 50% or more, about 60% or more, about 70% or more, or about 80% or more of the particles have one, two, three, or more shape-based measures that differ by not more than 5%, 10%, or 20% from the average of the shape-based measure for the collection of particles.

The term "aspect ratio", as used herein with regard to the shape of a nanoparticle, refers to any one of many different ratios of a major (long) diameter and a minor (short) diameter as measured for the particle. The aspect ratio can include the ratio of the longest diameter and the shortest diameter of the particle, the ratio of the longest diameter and the shortest diameter in the direction perpendicular to the longest diameter, the ratio of the shortest diameter and the longest diameter in the direction perpendicular to the shortest diameter, and reciprocal ratios thereof.

The term "roughness", as used herein with regard to the shape of a nanoparticle, refers to the ratio of the convex perimeter to the perimeter of the nanoparticle as obtained by TEM images.

The term "convex perimeter" is defined hereinafter as the average circumferential distance from high point to high point around the nanoparticle image measured from TEM. The term "roundness", as used herein with regard to the shape of a nanoparticle, refers to one or more measures of the closeness of the nanoparticle shape to the shape of a circle in the TEM. The roundness can be determined, for example, by the ratio of the measured area of the particle in the TEM to the area of a circle having a diameter equal to the largest diameter of the nanoparticle. The roundness can be determined, for example, as 47 times the ratio of the measured area of the particle in the TEM to the square of the measure perimeter of the particle in the TEM.

When referring to radiation, the term "visible" refers to radiation having a wavelength of about 300-800 nm, about 325-750 nm, about 350-740 nm, or about 370-720 nm; the term "ultraviolet" or "UV" refers to radiation having a wavelength of about 150-450 nm, about 170-400 nm, about 190-350 nm, or about 200-300 nm; and the term "infrared" or "IR" refers to radiation having a wavelength of about 0.7-1,000 µm, about 0.7-50 µm, about 0.74-14 µm, about 0.75-8 µm, or about 0.75-5 µm. The radiation can be described herein as "near ultraviolet" or "near UV" when the wavelength of the radiation is about 290-430 nm, about 300-400 nm, about 310-395 nm, or about 320-380 nm. The radiation can be described herein as "deep ultraviolet" or "deep UV" when the wavelength of the radiation is about 150-320 nm, about 185-310 nm, or about 200-300 nm. The radiation can be described herein as "violet" if it has a wavelength of about 300-450 nm, about 325-440 nm, about 350-430 nm, or about 360-420 nm; as "indigo" if it has a wavelength of about 400-480 nm, about 420-460 nm, about 430-450 nm, or about 440 nm; as "blue" if it has a wavelength of about 430-520 nm, about 440-510 nm, about 450-500 nm, or about 460-490 nm; as "cyan" if it has a wavelength of about 480-540 nm, about 490-530 nm, about 500-520 nm, or about 501 nm; as "green" if it has a wavelength of about 500-600 nm, about 510-580 nm, about 520-565 nm, or about 540-550 nm; as "yellow" if it has a wavelength of about 540-610 nm, about 550-600 nm, about 564-590 nm, or about 589 nm; as "orange" if it has a wavelength of about 570-650 nm, about 580-640 nm, about 590-625 nm, or about 593 nm; and as "red" if it has a wavelength of about 600-800 nm, about 610-780 nm, about 625-740 nm, or about 650-720 nm. The radiation can be described herein as "near infrared" or "NIR" if it has a wavelength of about 700-3,000 nm, about 740-1,400 nm, or about 750-1,000 nm; as "short-wave infrared" or "SWIR" if it has a wavelength of about 850-2,000 nm, about 900-1,700 nm, or about 1,000-1,400 nm; as "medium-wave infrared" or "MWIR" if it has a wavelength of about 2-8 µm, about 3-5 µm, or about 3.5-4.5 µm; and as "long-wave infrared" or "LWIR" if it has a wavelength of about 7-14 µm, about 8-12 µm, or about 9-10 µm.

Discussion:

Embodiments of the present disclosure provide for a continuous-flow reactor, methods of making metal nano-alloys, and metal nano-alloys. In particular, an embodiment of the present disclosure includes a continuous-flow reactor for the synthesis of metal nano-alloys. The reactor contains a first tubular component having a tubular inlet and a tubular outlet, and can contain a heated tube-in-tube gas reactor fluidly connected to the first tubular component. The heated tube-in-tube gas reactor has an inner tube having a gas permeable surface and an outer tube. The heated tube-in-tube gas reactor can be used to introduce one or more reducing gases into a fluid stream of the reactor.

The tubular components of the reactor can be made from fluoroplastics such as poly(tetrafluoroethylene) and metal alloys such as steel and nickel alloys. The continuous-flow reactor can be operated at an internal pressure of about 5-100 bar and a temperature of about 40-300° C. The reactor can contain one or more mixers for mixing fluid streams and a heated reactor. The residence time within the heated reactor can be about 1 second to 6 hours or about 5 seconds to 2 hours, or more, where typically, the shorter time frame is advantageous, but there may be instances where a longer time frame is desirable.

Continuous flow chemistry is the concept of continuously pumping reagents through a reaction and mixing vessel, where multistep clean synthesis could be carried out in a continuous flow-process manner and is readily applicable to automation. Advantages associated with continuous flow processes, in comparison with more traditional batch techniques, include the ability to independently vary and precisely control reaction parameters such as stoichiometry, temperature, pressure, flow rate and thereby residence time. This in turn leads to high reproducibility and provides the basis for scale-up or scale-out approaches using multiple reactors. At any given time, the amount of material actually contained within the flow reactor is low leading to both enhanced operational safety and presenting the opportunity to intervene without significant loss of potentially valuable substrates. Similarly, rapid automated serial processing creates the opportunity to screen for new reaction conditions or generate nanoparticle libraries for rapid evaluation. Pressurizing the flow reactor enables superheating of reaction mixtures and thereby utilizes solvents far beyond their boiling point. This significantly broadens the palette of solvents, surfactants and ligands for use in nano alloy synthesis.

An embodiment of the present disclosure includes a method of producing metal nano-alloys using continuous flow chemistry. The method includes contacting a growth solution (reducible metal precursor) and a reducing fluid in a continuous-flow reactor of the present disclosure to form a mixed solution and flowing the mixed solution through the continuous-flow reactor for a residence time to form the metal nano-alloys. The residence time can be about 1 second to 2 hours or more. The reducing fluid can be a reducing gas such as $H_2$, CO, or $NH_3$ and can be produced, for example, from a precursor such as metal carbonyl species and $NaBH_4$.

Embodiments of the methods can further include adding one or more surfactants to the mixed solution. In an embodiment, the surfactants can include small-molecule surfactants such as oleylamine, octadecylamine, hexadecylamine, dodecylamine, octylamine, butylamine, oleic acid, adamantaneacetic acid and adamantinecarboxylic acid, and polymer surfactants such as poly(alkylene oxides) and polyvinyl pyrollidones.

In an embodiment, the produced metal nano-alloys can be pure metal nano-alloys including metals such as Ni, Pt, Pd, Ru, Rh, and Ir. In an embodiment, the metal nano-alloys can contain two or more metals selected from the group consisting of Ni, Pt, Pd, Ru, Rh, Ir, Cu, Co, Fe, Ag, Au, Mn, In, P, and Ga. Examples of metal nano-alloys can include metal nano-alloy is selected from the group consisting of PtNi, PtCu, PtCo, PtFe, PtPd, PtAg, PtAu, PtMn, PtRu, NiAg, NiPd, NiAgPd, CuRh, CuRu, NiRh, NiRu, InP, and PtIr alloys. The alloys can have shape selected from the group consisting of octahedra, cubes, icosahedra, decahedra, rhomohedra, triangular and hexagonal plate. The metal nano-alloys can have a monodisperse size distribution and/or a uniform shape distribution. The metal nano-alloys can have an average diameter of about 2-100 nm. In an embodiment, the catalyst compositions containing the metal nano-alloys are also provided.

Now having described embodiments of the present disclosure in general, additional details will be provided regarding embodiments of the continuous-flow reactor, methods of use, and products formed therefrom.

In an embodiment, a continuous-flow reactor is provided that can be used to make nano-alloys. The continuous-flow reactor can have one or more interconnected tubular components combining one or more fluid streams into a heated coil reactor or other such pressurized reactor vessel. The reactor can be made from any suitable material that can withstand the temperatures and pressures required for forming the metal nano-alloys. The continuous-flow reactor can contain a gas reactor that allows for injection of one or more reactant gas into a fluid stream flowing through the continuous flow reactor for the formation of the metal nano-alloys.

FIGS. 1A and 1B depict one embodiment of a continuous-flow reactor for the synthesis of metal nano-alloys. The continuous-flow reactor 100 can be modular (e.g. having a collection of fluidly interconnected components) or can be made as a single or a few units each containing more than one of the components. Some or all of the fluidly interconnected tubular components may be easily removed and replaced and are typically provided in standard sizes. The continuous-flow reactor 100 can have one or more solvent reservoirs 110 and one or more fluidly interconnected tubular components. For example, the reactor can have a first tubular component 112a and a second tubular component 112b. The tubular components (112a and 112b) can be fluidly connected to the solvent reservoir 110 such that the solvent can flow through the tubular components.

The tubular components can be fluidly connected to a pump upstream of the solvent reservoir and in fluid communication with the solvent reservoir to drive the fluid stream(s) through the reactor 100 at the desired flow rate. The reactor 100 can contain a first pump 120a fluidly connected to the first tubular component 112a and upstream of the solvent reservoir 110 to drive a first fluid stream through the reactor at the desired flow rate. Likewise, the reactor 100 can contain a second pump 120b fluidly connected to the second tubular component 112b and upstream of the solvent reservoir 110 to drive a second fluid stream through the reactor at the desired flow rate. In an embodiment, the pump can be a syringe pump, a HPLC pump, a gear pump or any pump capable of delivering a up to 10-15 bar pressure.

The pumps can drive the fluid stream(s) through an injection loop. Injection loops are known in the art and are commonly used for applications such as liquid chromatography. Injection loops allow for a precise timing and amount of reactant to be injected into the reactor flow stream. Suitable injection loops are available from a variety of manufacturers including Valco Instruments Co. Inc. of Houston, Tex. The first pump 120a can drive the first fluid stream through a first injection loop 130a where one or more reactants can be injected into the first fluid stream. The second pump 120b can drive the second fluid stream through a second injection loop 130b where one or more reactants can be injected into the second fluid stream. In an embodiment, the rotor seal in the injection loop is made from a corrosion resistant material and thus withstands amine reagents.

One or more of the tubular components can be in fluid communication with a gas reactor that allows for injection of one or more reactant gases into a fluid stream flowing through the tubular component. For example, the first pump 120a can drive a first stream through the first injection loop 130a and into a heated tube-in-tube reactor 180 operably connected to a gas source, such as a gas pressure bottle 170, providing a defined pressure or amount of a reactant gas into the heated tube-in-tube gas reactor 180. The tube-in-tube reactor 180 can contain an outer tube 182 largely impermeable to reactant gasses and fluid streams and an inner tube 186 largely impermeable to the fluid streams but permeable to one or more reactant gasses, wherein the inner tube 186 extends within and along a length of the outer tube 182. For example, the inner tube 186 can extend within and along a length of the outer tube 182 such that the central axes of the tubes are parallel. In some embodiments the central axes of the inner tube 186 and the outer tube 182 are collinear along a length of the outer tube. The inner tube 186 will necessarily have a smaller external diameter than the internal diameter of the outer tube 182. The diameter of the inner tube 186 can, in some embodiments, be less than about 30%, 40%, 50%, 60%, or 70% of the internal diameter of the outer tube 182. The inner tube 186 can have an inner volume 188 allowing for the flow of a fluid or gas there through. In an embodiment, the outer tube as an inner diameter of about ⅛th inch. In an embodiment, the inner tube as an inner diameter of about ¹⁄₁₆th inch. The arrangement of the inner tube 186 within the outer tube 182 creates an outer volume 184 allowing for the flow of a fluid or gas through the outer tube 182 and in contact with the surface of the inner tube 187. In an embodiment, the tube diameter can be about 0.1 mm to 50 cm.

The surface of the outer tube 183 is made of a material that is largely impermeable to both the reactant gases and the fluid streams, thereby containing the fluid streams and reactant gases within the outer volume 184. The surface of the inner tube 187 is made of a material that is largely impermeable to the fluid streams but is permeable or semi-permeable to one or more reactant gases, thereby allowing for the flow of one or more reactant gases between the inner volume 188 and the outer volume 184 (e.g., one or more reactant gases is capable of flowing from the inner tube volume 188 to the outer tube volume 184) from the outer tube volume 184 to the inner tube volume 188, or both. In an embodiment, the outer tube can be thick walled perfluoropolymer or metal such as stainless steel or Hastelloy.

One of the inner tube volume 188 or the outer tube volume 184 is in fluid communication with a tubular component of the continuous-flow reactor 100, for example in fluid communication with the tubular components or injection loops, so as to allow a fluid stream to flow into the volume. The other volume (e.g., either the inner tube volume 188 or the outer tube volume 184) is in fluid communication with a gas source such as a gas pressure bottle 170 to maintain a pressure of the one or more gases within the volume. For example, the outer tube volume 184 can be in fluid communication with the tubular components or injection loops so as to allow a fluid stream to flow into the outer tube volume 184, and the inner tube volume 188 can be in fluid communication with a gas source such as a gas pressure bottle 170 to maintain a pressure of one or more reactant gasses within the inner tube volume 188. One or more reactant gasses can therefore pass from the inner tube volume 188 through the surface of the inner tube 187 and into the fluid stream in the outer tube volume 184. For example, the second injection loop 130b can be in fluid communication with the heated tube-in-tube reactor 180 such that one or more reactant gases are introduced into the second fluid stream.

The one or more tubular components are in fluid communication with a mixer 135 (e.g., the first injection loop 130a, the second injection loop 130b, and/or the heated tube-in-tube reactor 180 can be in fluid communication with the mixer 135). The one of more fluid streams are combined in the mixer 135 to form a single fluid stream. The mixer 135 can have any suitable configuration that combines the one or more input fluid streams. The mixers can be passive mixers or active mixers, both of which are known in the art. Suitable mixers known in the art include T-shaped mixers, Y-shaped mixers, convention mixers, serpentine mixers, convection mixers, and the like.

The mixer 135 can be in fluid communication with a heated coil reactor 140 or other such pressurized reactor vessel such that the fluid stream(s) are passed through the mixer and into the heated coil reactor 140 or reactor vessel. The pressure in the heated coil reactor can be controllably regulated to any pressure suitable for the reaction conditions. For example, the pressure in the heated coil reactor 140 can be about 5 bar to 200 bar, about 5 bar to 100 bar, or about 10 bar to 100 bar. The temperature in the heated coil reactor 140 can be controllably regulated to any temperature suitable for the reaction. For example the temperature in the heated coil reactor 140 can be about 20° C.-400° C., about 30° C.-300° C., or about 40° C.-260° C. The residence time of the fluid stream in the heated coil reactor 140 can be controllably adjusted by adjusting such parameters as the pressure and flow rates. The residence time of the fluid stream in the heated flow reactor 140 can be on the order of seconds, minutes, or hours. In some embodiments, the residence time in the heated flow reactor can be controllably be about 1 second and 10 hours, be about 10 seconds and 4 hours, be about 10 seconds and 2 hours, be about 30 seconds and 2 hours, or be about 30 seconds and 60 minutes.

The heated coil reactor 140 can be in fluid communication with a heat exchanger 150 capable of controlling the cooling rate of a reacted fluid stream passing from the heated coil reactor 140 through the heat exchanger 150. Heat exchangers for continuous flow reactors are generally known in the art. Examples of suitable heat exchangers include plate and frame heat exchangers, plate and fin heat exchangers, spiral heat exchangers, and shell-and-tube heat exchangers. The heat exchanger 150 is preferably constructed of corrosion resistant materials such as those described below. The reacted fluid stream containing the metal nano-alloys can be collected in a suitable collection vial or fluid sampler 190, and optionally further processed or purified.

The tubular components of the continuous flow reactor can generally be made of any material suitable to withstand the reaction parameters (e.g., capable of withstanding the required temperatures, pressures, and flow rates). The tubular components can be metal, metal alloys, or plastic. The tubular components can be steel, particularly stainless steel. The stainless steel can be austentic stainless steel, ferritic stainless steel, martensitic stainless steel, or a combination thereof. The stainless steel can be a duplex stainless steel. The austentic stainless steel can be 201, 202, 205, 301, 302, 302B, 303, 303Se, 304, 304L, 302HQ, 304N, 305, 308, 309, 309S, 310, 310S, 314, 316, 316L, 316F, 316N, 317, 317L, 317LMN, 321, 330, 347, 348, or 384 type stainless steel. The ferric stainless steel can be 405, 409, 429, 430, 430F, 430FSe, 434, 436, 442, or 446 type stainless steel. The martensitic stainless steel can be 403, 410, 414, 416, 416Se, 420, 420F, 422, 431, 440A, 440B, or 440C type stainless steel. The tubular components can be made from one or more metal alloys commonly referred to under the trade name HASTELLOY® and marketed by Haynes International, Inc. of Kokomo, Ind. The HASTELLOY® alloys are Ni alloys containing varying percentages of Co, Cr, Mo, W, Fe, Si, Mn, and C, and can include the alloys commonly referred to as B-2, B-3, C-4, C-2000, C-22, C-276, G-30, N, W, and X. The tubular components can include one or more polymers or polymer coatings, especially fluorinated polymers such as polytetrafluoroethylene (PTFE) and polyfluoroalkyl alkanes (PFA). For example, in some embodiments, the continuous flow reactor contains Teflon tubular components and/or contains tubular components lined with Teflon.

As stated above, metal nano-alloys can be synthesized by continuous-flow reaction, preferably using a gaseous reducing agent introduced through a gas reactor for the safe and continuous delivery of the reducing gas. A reducible metal precursor can be reacted with a reducing gas in the continuous-flow reactor to produce the metal nano-alloys, preferably having a monodisperse size distribution and a uniform shape distribution. The size and shape distributions can be controllably modified by adjusting parameters such as the reactor pressure, temperature, and the make-up and residence time of the reactant stream in the reactor. The selection of appropriate small-molecule ligands and surfactants can be used to further control the nano-alloy shape and size. The reducible metal precursor is a material which on contact with a reducing gas at a particular temperature is reduced. For example, the reducible metal precursor can contain platinum, palladium, gold, silver, ruthenium, rhodium, osmium, iridium, indium, phosphorous, titanium, vanadium, chromium, manganese, molybdenum, zirconium, niobium, tantalum, zinc, cadmium, bismuth, gallium, germanium, indium, tin, antimony, lead, tungsten, samarium, gadolinium, copper, cobalt, nickel, iron, or combinations thereof. The reducible metal precursor can be a metal-based salt or a hydrated form thereof, a metal-based acid or a hydrated form thereof, a metal-based base or hydrated form thereof, or an organometallic compound.

Examples of metal-based salts include $PtCl_2$, $PtCl_4$, $K_2PtCl_6$, $K_2PtCl_4$, $H_2PtCl_6$, $H_2PtBr_6$, $Pt(NH_3)Cl_2$, $PtO_2$, $Na_2PdCl_4$, $Pd(NO_3)_2$, $HAuCl_4$, $Ag(NO_3)_2$, $NiCl_2$, $CoCl_2$, $CuCl_2$, $FeCl_3$, and the like. Examples of metal-based salts also include hydrated forms of such metal-based salts.

In an embodiment, the organometallic compounds include metal-acetylacetonate compounds such as $Pt(acac)_2$, $Pd(acac)_2$, $Ni(acac)_2$, $Co(acac)_2$, $Cu(acac)_2$, $Fe(acac)_3$, $Ag(acac)$, and the like; metal-fluoroacetylacetonate compounds such as $Pt(CF_3COCHCOCF_3)_2$, $Ag(CF_3COCHCOCF_3)$ and the like; and metal-acetate compounds such as $Pd(ac)_2$, $Ni(ac)_2$, $Co(ac)_2$, $Cu(ac)_2$, $Fe(ac)_3$, silver stearate, and the like, metal-cyclooctadience compounds such as $Pt(1,5-C_8H_{12})Cl_2$, $Pt(1,5-C_8H_{12})Br_2$, $Pt(1,5-C_8H_{12})_2$ and the like.

The reducible metal precursor and the reducing agent or reducing gas can be combined in a suitable solvent in the continuous flow reactor. The solvent can be an organic solvent, an aqueous solvent (e.g., from 0.1% to 100% water, including all ranges there between), an ionic liquid, or a mixture thereof. Examples of suitable organic solvents include, but are not limited to alcohols (such as of methanol, ethanol, ethylene glycol (EG), glycerol, polyethylene glycol (PEG), and the like), ethers (such as diphenyl ether, octyl ether and the like) and amines (such as oleylamine, octadecylamine, hexadecylamine, dodecylamine, octylamine, butylamine and the like) and combinations of suitable organic solvents.

The reducing gas can be hydrogen gas, carbon monoxide gas, ammonia gas, ozone gas, peroxide gas, hydrogen sulfide gas, or a combination thereof. The hydrogen gas can be provided in a gas bottle or can be produced by a suitable precursor. Suitable precursors can include, for example metal carbonyl precursors as precursors for carbon monoxide or $NaBH_4$ as a precursor for hydrogen gas.

Metal nano-alloys are provided. The size of a metal nano-alloy is generally about 1-1,000 nm, but more typically about 1-100 nm, about 1-20 nm, about 1-10 nm, or about 2-10 nm. A plurality of the metal nano-alloys may or may not have a monodisperse size distribution, although monodisperse size distributions are preferred. A plurality of the metal nano-alloys may or may not have a uniform shape distribution, although uniform shape distributions are preferred. In some embodiments metal nano-alloys are provided having a monodisperse size distribution and a uniform shape distribution.

In an embodiment, the metal nano-alloys can generally include any combination of one, two, or three or more metals. The metal nano-alloys can include a metal core containing PtNi, PtCu, PtCo, PtFe, PtPd, PtAg, PtAu, PtMn, PtRu, NiAg, NiPd, NiAgPd, CuRh, CuRu, NiRh, NiRu, or PtIr alloys. The metal nano-alloys can include $Pt_aNi_b$, $Pt_aCu_b$, $Pt_aCo_b$, $Pt_aFe_b$, $Pt_aPd_b$, $Pt_aAg_b$, $Pt_aAu_b$, $Pt_aMn_b$, $Pt_aRu_b$, $Ni_aAg_b$, $Ni_aPd_b$, $Ni_aAg_bPd_c$, $Cu_aRh_b$, $Cu_aRu_b$, $Ni_aRh_b$, $Ni_aRu_b$, or $Pt_aIr_b$ alloys, where $0<a<1$, $0<b<1$, $0<c<1$, and where the sum of a, b, and c (when present) equals 1. In some embodiments, the metal nano-alloy is a NiPt nano-alloy or a InP nano-alloy.

In an embodiment, the metal nano-alloys can have an average diameter of about 1.0-50.0 nm, about 2.0-20.0 nm, or about 2.0-10.0 nm. The monodisperse size distribution can have a span of less than 2.0, less than 1.0, less than 0.8, less than 0.6, or less than 0.2. The monodisperse size distribution can have a coefficient of variation of less than about 0.5. In some embodiments, at least 40%, preferably at least 50%, of the metal nano-alloys in a plurality of metal nano-alloys have a diameter within ±0.5 nm of the average diameter of the metal nano-alloys.

The metal nano-alloys can generally be made with any suitable shape. The metal nano-alloys can have a shape selected from octahedral, tetrahedral, dodecahedron, icosahedral, truncated octahedral, truncated tetrahedral, cubic, spherical, bipyramid, multipod, nanotube, nanowire, and porous nanowire. The metal nano-alloys can have a uniform shape distribution. For example, about 40% or more, about 50% or more, about 60% or more, about 70% or more, or about 80% or more of the metal nano-alloys can have an aspect ratio that differs by not more than 5%, 10%, or 20% from the average aspect ratio for the collection of metal nano-alloys. About 40% or more, about 50% or more, about 60% or more, about 70% or more, or about 80% or more of the metal nano-alloys can have a sphericity that differs by not more than 0.05, 0.10, or 0.20 from the average sphericity for the collection of metal nano-alloys.

In an embodiment, the metal nano-alloys can contain one or more surfactants such as a small-molecule ligand or a polymer surfactant. Small-molecule ligands can control the shape of the metal nano-alloys. The small-molecule ligand will preferably have a functional group capable of coordinating with the metal nano-alloy. For example, the small-molecule ligand can have a nitrogen, oxygen, phosphorous, or sulfur atom. The small-molecule ligand can include an alcohol, amine, carboxylic acid, phosphonic acid, or sulfuric acid functional group. The small-molecule ligand can include an alkyl or cycloalkyl carboxylic acid having from 3 to 20 or from 6 to 12 carbon atoms. For example, the small-molecule ligand can be 1-adamantane carboxylic acid or a derivative thereof. Surfactants can include one or more functional groups having at least one nitrogen, oxygen, sulfur, phosphorus atom or a combination thereof. Examples of suitable surfactants include, but are not limited to, oleylamine, octadecylamine, hexadecylamine, dodecylamine, octylamine, butylamine, oleic acid, adamantaneacetic acid and adamantinecarboxylic acid, polyvinylpyrrolidone (PVP), citrate acid, sodium citrate, cetylpyridinium chloride (CPC), tetractylammonium bromide (TTAB), cetyl trimethylammonium bromide (CTAB), cetyl trimethylammonium chloride (CTACl) and combinations of surfactants. Surfactants can include $C_4$-$C_{18}$ alkyl amines. Surfactants can include polymer surfactants such as poly(alkylene oxides) and polyvinyl pyrollidone (PVP).

Embodiments of the present disclosure can be used in displays, photodetectors, medical devices, photovoltaic devices, catalysts compositions, and the like. In an embodiment, NiPt metal nano-alloys can be used as catalysts compositions and used in chemical reactors, in fuel cells, membrane reactors, chemical batteries, and the like. In addition, the NiPt metal nano-alloys can be used in pharmaceutical formulations for diagnostic or therapeutic effects.

In an embodiment, the synthesis of InP metal nano-alloys (e.g., quantum dots) can use toluene at temperature of about 110-400° C., octadecene or a suitable solvent using indium myristate or other precursors based on surfactants such as oleic acid, oleylamine, and the like. In an embodiment, an actively cooled heat exchanger (e.g., Peltier type, air convection cooled or cooling liquid) can be used to manage the temperature at a temperature of 0-100° C. In an embodiment, the method can be used to produce a InP metal nano-alloy having a shell (e.g., during synthesis or post synthesis) made of a material such as zinc, zinc blende/wurzite, zinc sulfide, zinc selenide, zinc selenium sulfide, cadmium sulfide, cadmium selenide, gallium, gallium arsenide, gallium phosphide, indium arsenide, indium gallium arsenide, arsenide, and the like. In addition, method of the present disclosure can be used to add a dopant (e.g., ytterbium, boron, copper, bismuth, tin) into the shell of the InP metal nano-alloy.

As will be apparent to those of skill in the art upon reading this disclosure, each of the individual embodiments described and illustrated has discrete components and features which may be readily separated from or combined with the features of any of the other several embodiments without departing from the scope or spirit of the present disclosure. Any recited method can be carried out in the order of events recited or in any other order logically possible.

EXAMPLES

Now having described the embodiments of the present disclosure the following Examples describe some additional embodiments of the present disclosure. While embodiments of the present disclosure are described in connection with the following examples and the corresponding text and figures, there is no intent to limit embodiments of the present disclosure to this description. The intent is to cover all alternatives, modifications, and equivalents within the spirit and scope of embodiments of the present disclosure.

Chemicals and Methods

Toluene and $W(CO)_6$ were purchased from Sigma Aldrich. $Pt(acac)_2$ and $Ni(acac)_2$ from STREM and used as delivered. $Ni(acac)_2$ was weighed as the dihydrate. Oleylamine 90% and 1-adamantane carboxylic acid were purchased from Acros. Reactions were carried out using a PTFE Uniqsis FlowSyn reactor. Centrifugation was done on an Eppendorf Centrifuge 5430.

Example 1

Continuous-Flow Synthesis of Ni—Pt Nano-Alloys

Nickel-Platinum nano alloys were synthesized by flowing the precursors $Ni(acac)_2.2H_2O$ and $Pd(acac)_2$ dissolved in toluene along with oleylamine as the surfactant with $W(CO)_6$ in toluene. A flow reactor fitted with two 5 mL sample loops, a 20 mL 316 stainless steel coil reactor, a heat exchanger, a back pressure regulator (10 bar) was utilized. A solution of $Pt(acac)_2$ (22 mg, $5.59*10^{-5}$ mol), $Ni(acac)_2.2H_2O$ (14.4 mg, $5.59*10^{-5}$ mol), 1-adamantanecaboxylic acid (20.0 mg, $1.11*10^{-4}$ mol), oleylamine (0.73 mL, $2.22*10^{-4}$ mol) in toluene (4.27 mL) was loaded into a 5 mL sample loop A. A ligand, 1-adamantane carboxylic acid was added for increased shape control. A solution of $W(CO)_6$ (50.0 mg, $1.42*10^{-4}$ mol) in toluene 5 mL was loaded into sample loop B. The reactor was heated to 220°

C. and both pumps set to a flow rate of 0.5 mL/min. The flexibility of the flow system provided control of the reaction temperature and residence time. Once the pressure was stable the two sample loops were set to inject. The two streams mix in a mixing device and continue through the stainless steel coil reactor, heat exchanger and the back pressure regulator. A product stream containing black nanoparticles was collected. The product was precipitated with methanol and centrifuged at 12,000 RPM for 30 min. The supernatant was discarded and the particle washed with methanol again. Following centrifugation and discarding of supernatant the particles were re-suspended in toluene and placed on to copper TEM grids.

A residence time of 40 seconds at 240° C., with $Pt(acac)_2$ and $Ni(acac)_2.2H_2O$, afforded particles of 2.8 nm+–0.6 nm size with a uniform octahedral shape. Increasing the residence time to 10 minutes at 200° C., with $Pt(acac)_2$ and $Ni(acac)_2.2H_2O$, resulted in particles of a 4.5±0.6 nm size again with octahedral shape. By selecting a residence time of 10 minutes at 200° C., with $PtCl_4$ and $NiCl_2.6H_2O$, we were pleased to observe the formation of alloys of 9 nm size+–2 nm and a uniform octahedral shape. It was found that using 1-adamantane carboxylic acid as a ligand we were able to obtain a more uniform size and shape distribution.

By examining different chain lengths of amine surfactants ranging from butylamine to dodeccylamine it was shown that octahedra from 2.4 nm+–0.5 nm to 5.1 nm+–0.9 nm.

Example 2

Characterization of Ni—Pt Nano-Alloys
Transmission electron microscopy was carried out on the Titan G2 80-300CT, FEI Company, the Titan G2 80-300ST, FEI Company, Super Twin, x-FEG, by operating at 300 kV.

Example 3

Figure 6:
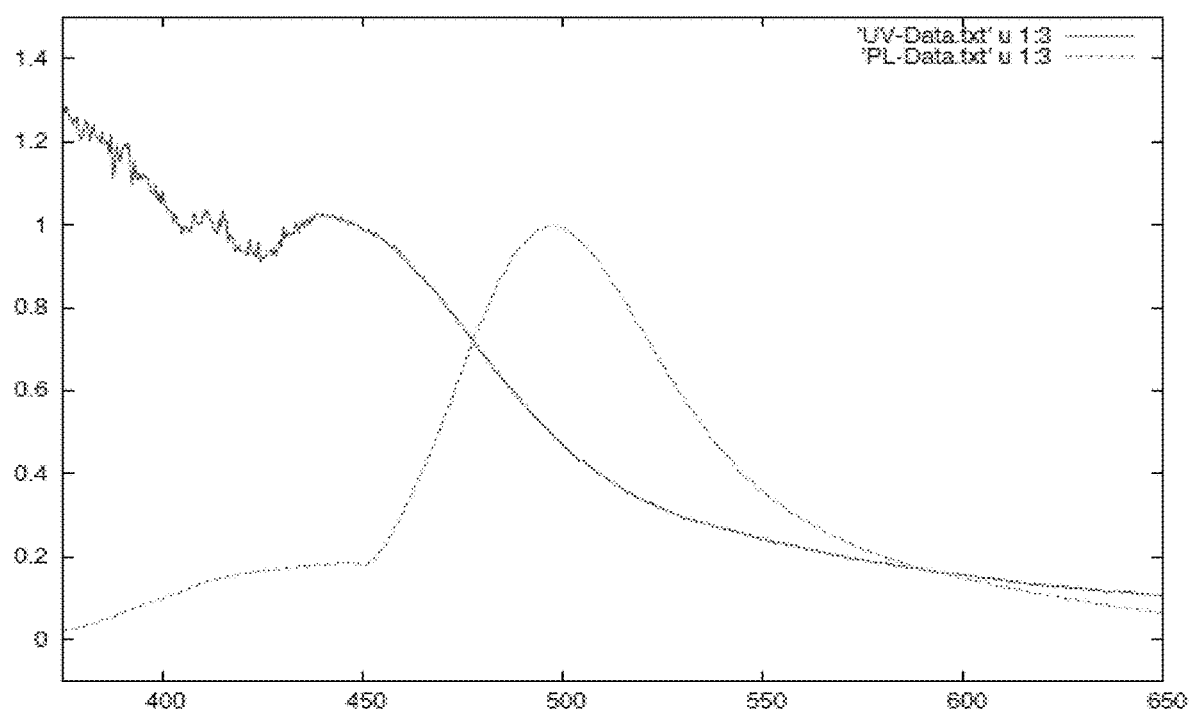
FIG. 6 illustrates UV-Vis and photoluminesence measurements of a solution of the present disclosure.

Synthesis of Indium Phosphide Particles with or without a Covering Shell
Typical Procedure:
A solution of indium myristate (0.01M-2 M) typically in toluene or octadecene was injected into an injection loop. A solution of tris-trimethylsilyl phosphine (0.01M-2M) was injected into the second injection loop. The solutions were passed through a mixer into a reactor at 340° C. for a residence time of 1-60 min. An actively cooled heat exchanger was used. The pressure was set to 30 bar. The resulting solution was characterized by UV-Vis and photoluminesence measurements (FIG. 6).

Where a range of values is provided, it is understood that each intervening value, to the tenth of the unit of the lower limit unless the context dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both are also included in the disclosure.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

We claim:

1. A method of producing a metal nano-alloy, the method comprising:
    contacting a solution comprising a reducible metal precursor and a reducing gas in a continuous-flow reactor to form a mixed solution; and
    flowing the mixed solution through a coil reactor of a continuous-flow reactor for a residence time to form the metal nano-alloy;
    wherein the reducible metal precursor is selected from the group consisting of a metal-based salt or a hydrated form thereof, a metal-based acid or a hydrated form thereof, a metal-based base or hydrated form thereof, an organometallic compound, and a combination thereof;
    wherein the reducing gas is selected from the group consisting of hydrogen gas, carbon monoxide gas, ammonia gas, ozone gas, peroxide gas, hydrogen sulfide gas, and a combination thereof.

2. The method of claim 1, including providing the continuous-flow reactor: with a first tubular component having a tubular inlet and a tubular outlet, and a heated tube-in-tube gas reactor fluidly connected to the first tubular component, wherein the heated tube-in-tube gas reactor is provided with an inner tube having a gas permeable surface and an outer tube.

3. The method of claim 2, wherein the surface of the inner tube is made of a material that is impermeable to a fluid stream but is permeable or semi-permeable to one or more reducing gases, thereby providing for the flow of the one or more reducing gases between a volume of the inner tube and a volume of the outer tube.

4. The method of claim 1, wherein the reducible metal precursor is selected from the group consisting of: $PtCl_2$, $PtCl_4$, $K_2PtCl_6$, $K_2PtCl_4$, $H_2PtCl_6$, $H_2PtBr_6$, $Pt(NH_3)Cl_2$, $PtO_2$, $Na_2PdCl_4$, $Pd(NO_3)_2$, $HAuCl_4$, $Ag(NO_3)_2$, $NiCl_2$, $CoCl_2$, $CuCl_2$, and $FeCl_3$.

5. The method of claim 1, wherein the reducible metal precursor is selected from the group consisting of: a metal-acetylacetonate compound, a metal-fluoroacetylacetonate compound, a metal-acetate compound, a metal-cyclooctadien e compound, and a combination thereof.

6. The method of claim 1, wherein the metal nano-alloy is a pure metal nano-alloy, wherein the metal nano-alloy comprises two or more metals selected from the group consisting of Ni, Pt, Pd, Ru, Rh, Ir, Cu, Co, Fe, Ag, Au, and Mn.

7. The method of claim 6, wherein the metal nano-alloy is selected from the group consisting of PtNi, PtCu, PtCo, PtFe, PtPd, PtAg, PtAu, PtMn, PtRu, NiAg, NiPd, NiAgPd, CuRh, CuRu, NiRh, NiRu, and PtIr alloys.

8. The method of claim 1, including providing the continuous-flow reactor with two or more tubular components each having a tubular inlet and a tubular outlet, the tubular outlets being interconnected and configured to combine a fluid steam from each of the two or more tubular components and direct the combined fluid stream into a heated coil reactor, and a heated tube-in-tube gas reactor fluidly connected to at least one of the tubular components, wherein the heated tube-in-tube gas reactor comprises an inner tube having a gas permeable surface and an outer tube.

9. The method of claim 1, wherein the solution of the reducible metal precursor further comprises a surfactant selected from the group consisting of oleylamine, octadecylamine, hexadecylamine, dodecylamine, octylamine, butylamine, oleic acid, adamantaneacetic acid, adamantinecarboxylic acid, polyvinylpyrrolidone (PVP), citrate acid, sodium citrate, cetylpyridinium chloride (CPC), tetractylammonium bromide (TTAB), cetyl trimethylammonium bromide (CTAB), cetyl trimethylammonium chloride (CTACl) and combinations thereof.

10. The method of claim 9, wherein the reducing gas is carbon monoxide, the surfactant is adamantinecarboxylic acid or oleylamine, and the reducible metal precursor is a metal-acetylacetonate compound, $PtCl_2$, $PtCl_4$, $K_2PtCl_6$, $K_2PtCl_4$, $H_2PtCl_6$, $H_2PtBr_6$, $Pt(NH_3)Cl_2$, $Na_2PdCl_4$, $HAuCl_4$, $NiCl_2$, $CoCl_2$, $CuCl_2$, $FeCl_3$, or a combination thereof.

* * * * *